(12) United States Patent
Heibel (10) Patent No.: US 11,289,221 B2
(45) Date of Patent: Mar. 29, 2022

(54) DETECTION APPARATUS, SYSTEM, AND METHOD FOR DETECTION OF COOLANT FLOW RATE AND TEMPERATURE IN A NUCLEAR ENVIRONMENT

(71) Applicant: WESTINGHOUSE ELECTRIC COMPANY LLC, Cranberry Township, PA (US)

(72) Inventor: Michael D. Heibel, Harrison City, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 387 days.

(21) Appl. No.: 16/561,472

(22) Filed: Sep. 5, 2019

(65) Prior Publication Data
US 2021/0074440 A1 Mar. 11, 2021

(51) Int. Cl.
*G21C 17/032* (2006.01)
*G01F 1/712* (2006.01)
(Continued)

(52) U.S. Cl.
CPC .......... *G21C 17/032* (2013.01); *G01F 1/712* (2013.01); *G21C 17/10* (2013.01); *G21C 17/112* (2013.01); *G01F 1/86* (2013.01)

(58) Field of Classification Search
CPC .... G21C 17/032; G21C 17/10; G21C 17/102; G21C 225/02; G21C 225/022;
(Continued)

(56) References Cited

U.S. PATENT DOCUMENTS 4,322,982 A * 4/1982 Muller .............. G01F 1/58
73/861.12
2004/0226387 A1* 11/2004 Frick .............. G01F 15/12
73/861.57
(Continued)

FOREIGN PATENT DOCUMENTS

JP S53157295 U 12/1978

OTHER PUBLICATIONS

International Search Report and Written Opinion for International PCT Application No. PCT/US2020/049344, dated Nov. 23, 2020.

*Primary Examiner* — Darlene M Ritchie
(74) *Attorney, Agent, or Firm* — K&L Gates LLP (57) ABSTRACT

A detection apparatus is a flow and temperature measuring device in the form of a tube having a channel positioned parallel to a coolant flow stream and contains a drogue that is firmly attached to a mount within the channel. The mount has a load detection apparatus firmly imbedded near the flow inlet to the tube. The drogue has at least neutral buoyancy in the fluid at the minimum fluid temperature of interest. A change in the buoyancy of the drogue as a function of temperature and a corresponding change in the strain detection apparatus output in the fluid is determined by a combination of simple physics and calibration measurements. The relationship between changes in strain detection apparatus signal output and flow-rate-induced forces applied to the drogue surface are also determined using a combination of simple physics and calibration measurements. A system and method are also described.

17 Claims, 8 Drawing Sheets

(51) Int. Cl.
*G21C 17/10* (2006.01)
*G21C 17/112* (2006.01)
*G01F 1/86* (2006.01)

(58) Field of Classification Search
CPC ............ G21C 225/025; G21C 225/038; G21C 225/112; G01F 1/712; G01F 1/28; G01F 1/00; G01F 1/005; G01F 1/86; G01F 23/0038
See application file for complete search history.

(56) References Cited

U.S. PATENT DOCUMENTS

| | | | |
|---|---|---|---|
| 2009/0000393 A1* | 1/2009 | Nyfors | G01F 1/363 73/861.19 |
| 2017/0358374 A1* | 12/2017 | Loewen | G21C 17/10 |
| 2019/0180884 A1 | 6/2019 | Carvajal et al. | |
| 2019/0212178 A1* | 7/2019 | Toma | G01F 1/40 |

* cited by examiner

DETECTION APPARATUS, SYSTEM, AND METHOD FOR DETECTION OF COOLANT FLOW RATE AND TEMPERATURE IN A NUCLEAR ENVIRONMENT

BACKGROUND

1. Field

The disclosed and claimed concept relates generally to nuclear reactors and, more particularly, to a detection apparatus, system, and method for detecting temperatures and flow rates of a coolant in a nuclear reactor.

2. Related Art

Numerous types of nuclear reactors are known. A nuclear reactor typically is situated within a containment, and fuel within the reactor undergoes a controlled nuclear fission reaction to result in heat being added to a coolant. The coolant typically flows through a primary loop that is situated in heat exchange relation with a secondary loop from which heat is extracted for the performance of useful work.

During operation of such a reactor, it would be desirable to enable measurement of reactor power level, power distribution, and margin with respect to reactor operating limits. However, a convenient and cost effective approach to obtain these measurements has been difficult to implement. Improvements thus would be desirable.

SUMMARY

The detection apparatus described herein uses the forces imposed on a drogue contained within a cylindrical channel of a tube to measure the temperature and mass flow rate of a fluid passing through the tube. The forces are measured via strain measurements from a strain detection apparatus located at the fluid flow inlet of the tube that is anchored to a specifically designed and constructed drogue object contained within the tube.

The drogue object has at least neutral buoyancy in the fluid at the minimum fluid temperature of interest. The change in the buoyancy of the drogue as a function of temperature and the corresponding change in the strain detection apparatus output in the fluid is determined by a combination of simple physics and calibration measurements. The relationship between changes in strain detection apparatus signal output and flow-rate-induced forces applied to the drogue surface are also determined using a combination of simple physics and calibration measurements.

If flow rate is known to be steady, the changes in strain signal will represent changes in buoyancy forces and therefore changes in fluid temperature. If temperature is known to be steady, the changes in the measured strain signal will represent changes in flow rate. Relative changes in fluid temperature and flow rate can be determined using an understanding of the strain signal time history and the maximum flow and temperature change rates that can be achieved in the fluid environment via the heat and flow forcing functions in the fluid environment.

The ability to measure reactor coolant flow distribution and the corresponding temperature distribution at the inlet and outlet of the reactor core in commercial power reactors would allow the measurement of reactor power level, power distribution, and margin to reactor operating limits to be determined based only on thermodynamic principles. No nuclear radiation measurements would be needed. However, a convenient and cost effective approach to obtain these measurements has previously been difficult to implement. The ability to measure coolant flow and temperature at the inlet and outlet of the core and using thermodynamic principles to convert this information to reactor power distribution and margin to operating limits would greatly simplify the reactor power distribution measurement process. This would be particularly true in reactor designs where the coolant/moderator suppresses the amount of radiation available for nuclear radiation monitoring, such as a Lead Fast Reactor (LFR).

An improved detection apparatus that is set forth in greater detail below is a flow and temperature measuring device in the form of a tube positioned parallel to a coolant flow stream and contains a drogue in the exemplary form of a ball of material with a very low thermal expansion coefficient, such as tungsten or other appropriate material, that is firmly attached to a mount in the exemplary form of a thin rod. The rod has a load detection apparatus in the exemplary form of a strain gauge firmly imbedded near the flow inlet to the tube. The rod is fixed to the tube at the flow inlet by a cross-shaped base with a very low thermal expansion coefficient and very high structural rigidity, such as tungsten or other appropriate material. The base is configured to provide a very low flow interaction cross section. The rod freely passes through a similar structure at the flow exit end of the tube that serves to maintain the axial alignment of the ball in the tube and capture the ball should it somehow separate from the rod. The electrical resistance measurements from the strain gauge are measured through a Mineral Insulated (MI) cable that is routed out of the reactor environment to a data processing system for signal processing.

The ball object has at least neutral buoyancy in the fluid at the minimum coolant/moderator fluid temperature of interest. The buoyancy forces acting on the ball in the tube will change as a function of the temperature of the surrounding fluid. The change in the buoyancy of the ball as a function of the temperature of the fluid surrounding the drogue and the corresponding change in the strain detection apparatus output may be determined using a combination of simple physics and calibration measurements. The relationship between changes in strain detection apparatus signal and flow rate induced forces applied to the drogue at its surface may also be determined using a combination of simple physics and calibration measurements.

If flow rate is known to be steady, such as if a specially-configured detection apparatus has a blocked inlet end, with the result that the coolant fluid will be stagnant in the channel of the tube, the changes in strain signal will represent changes in buoyancy forces and therefore changes in fluid temperature. If the temperature is known to be steady, such as indicated by the same or another specially-configured detection apparatus that has a blocked inlet end, the changes in the measured strain signal will represent changes in flow rate. Relative changes in fluid temperature and flow rate can also be determined using an understanding of the strain signal time history and the maximum flow and temperature change rates that can be achieved in the fluid environment via the heat and flow forcing functions in the fluid environment.

Positioning the detection apparatus tubes such that the radial and axial positions of the detection apparatus are firmly fixed in place with respect to a surrounding support structure and are vertically aligned above and below the reactor core will allow the reactor power in the corresponding measurement zone as a function of time to be determined using the flow and temperature differences between the detection apparatus devices situated above and below the reactor core with the simple expression:

$$\text{Power}(t) = \dot{m}(t)\Delta h(t) = \dot{m}(t)c_p(T(t))\Delta T(t)$$

The value of the change in fluid temperature at time $t_2$, $\Delta T = T(t_2) - T(t_1)$, is determined from the change in the buoyancy force acting on the object contained within the tube. The buoyancy force acting on the drogue object produces a strain force, $F_b(t)$, that is given by the expression:

$$F_b(t) = \rho(T(t))gV$$

Changes in fluid temperatures, indicated by changes in measured strain values, may be determined from the ratios of the strain force values using the expression:

$$\rho(T(t_2))\frac{F_b(t_1)}{F_b(t_2)} = \rho(T(t_1))$$

An expression for the density of lead, which in the depicted exemplary embodiment is employed as a coolant, as a function of temperature is:

$$\rho(T(t)) = 11441 - 1.2795 T(t)$$

The temperature at time $t_2$ is then:

$$T(t_2) = \frac{F_b(t_2)}{F_b(t_1)} T(t_1)$$

The expression for the change in temperature is the $$\Delta T(t_2) = T(t_2) - T(t_1) = \left\{\frac{F_b(t_2)}{F_b(t_1)} - 1\right\} T(t_1)$$

At constant temperature the flow induced force acting on the shape in the tube may be expressed:

$$F(t) = K(\dot{m}(t))$$

Using the relationships for calculating mass flow rate ($\dot{m} = \rho(T)Av_L$) and the expression for force in terms of mass and acceleration (F=ma) allows the development of an expression for characterizing a mass flow rate at, time $t_2$ as follows:

$$\dot{m}(t_2) = \dot{m}(t_1) + K(F(t_2) - F(t_1))$$

The constant K and the value of the initial mass flow rate at time $t_1$ can be determined in the calibration process. The force values can be replaced by the strain forces measured at constant temperature. The effect of temperature on the mass flow rate calculation can be captured by adjusting the fluid densities used in the root flow rate expression $\dot{m} = \rho(T)Av_L$.

Figure 1:
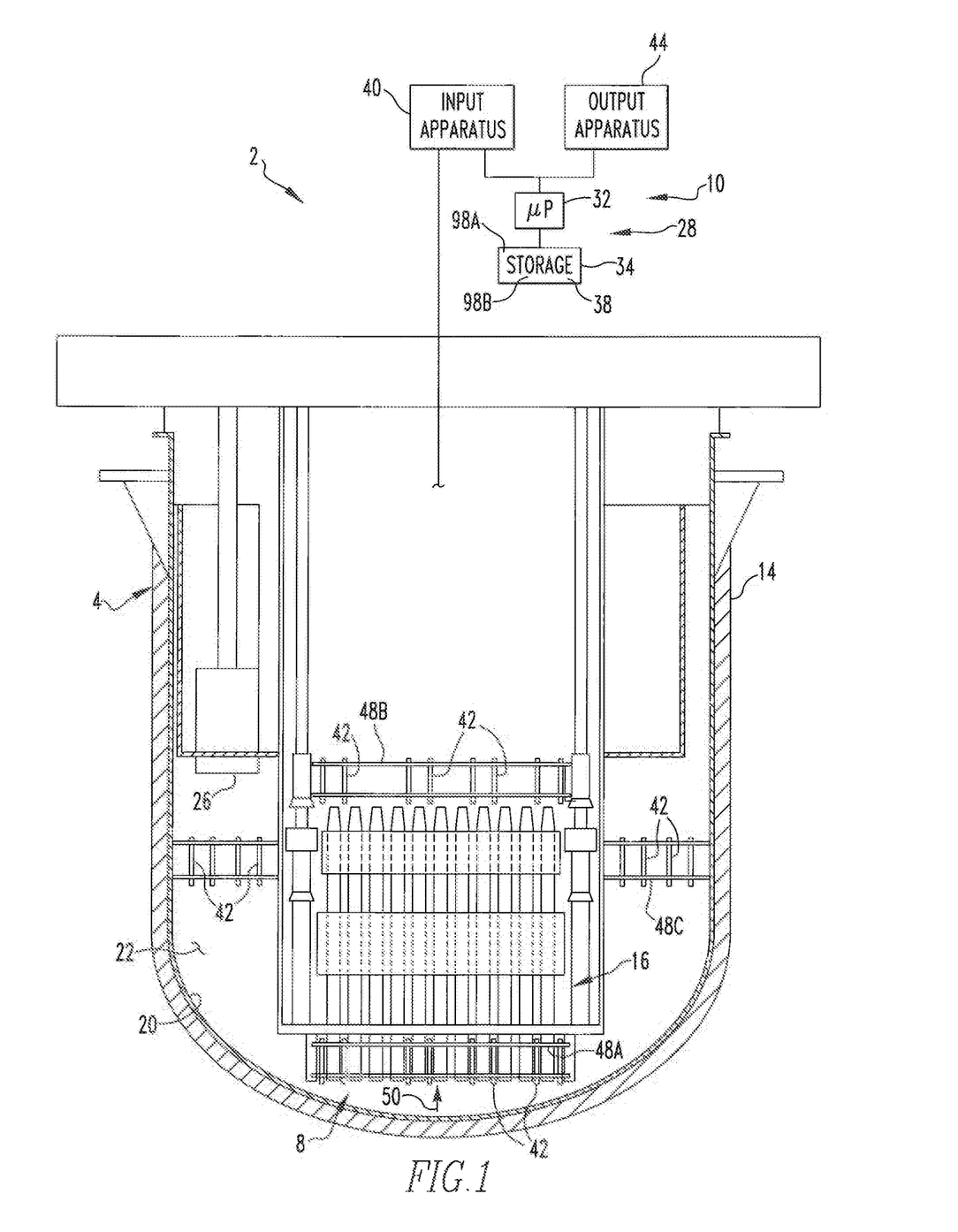
FIG. 1 is an exemplary depiction of an improved system in accordance with the disclosed and claimed concept.

The temperature and flow contributions from the different fuel assemblies to the inlet of a specific device may be captured using the "mixing factor" approach or modeled using a benchmarked CFD model and can be used to determine the power level of individual fuel assemblies, FIG. 1 provides a schematic representation in an LFR system.

The system and detection apparatus of the disclosed and claimed concept advantageously provide the capability to determine the reactor power level and margins to fuel operating limits using simple thermodynamic calculation methods.

The detection, apparatus of the disclosed and claimed concept advantageously consists of a very simple structure that can be easily manufactured and deployed in arrays across the top and bottom of the reactor.

The detection apparatus of the disclosed and claimed concept advantageously does not require a supply of power in the extreme reactor environment, and signal processing is advantageously performed by a data processing system situated external to a containment of the reactor.

The system and detection apparatus of the disclosed and claimed concept, advantageously allow flow measurements to be obtained in any location in the reactor environment when it is oriented parallel to the flow direction.

The system and detection apparatus of the disclosed and claimed concept advantageously allow simultaneous measurements of flow rate and surrounding fluid temperature if the gravitational force is other than orthogonal to the flow path.

Accordingly, an aspect of the disclosed and claimed concept is to provide an improved detection apparatus structured to be situated within a flow of a fluid in a nuclear containment. The detection apparatus can be generally stated as including a support that can be generally stated as including a body, the body having a channel formed therein, a drogue situated on the support and being disposed within the channel, and a measurement apparatus that can be generally stated as including a load detection apparatus that is situated between the drogue and the support and that is structured to output a signal that is responsive to a load on the drogue due to the fluid within the channel.

Another aspect of the disclosed and claimed concept is to provide an improved system can be generally stated as including a nuclear reactor that can be generally stated as including a containment, a core situated within the containment, and a fluid situated within the containment and in communication with the core, a plurality of detection apparatuses situated within the containment and disposed in the fluid, each detection apparatus can be generally stated as including a support, a drogue, and a measurement apparatus, the support can be generally stated as including a body, the body having a channel formed therein, the drogue situated on the support and being disposed within the channel, the measurement apparatus can be generally stated as including a load detection apparatus that is situated between the drogue and the support and that is structured to output a signal that is responsive to a load on the drogue due to the fluid within the channel, a processor apparatus that can be generally stated as including a processor and a storage, the load detection apparatus being in communication with the processor, the storage having stored therein a number of instructions which, when executed on the processor, cause the detector apparatus to perform operations that can be generally stated as including receiving the signal from each of at least some of the plurality of detection apparatuses as a number of inputs to the processor, and determining at least one of a temperature of the fluid and a flow rate of the fluid based at least in part upon the number of inputs.

Another aspect of the disclosed and claimed concept is to provide an improved method employed in conjunction with a nuclear reactor having a containment, a core situated within the containment, and a fluid situated within the containment and in communication with the core. The method can be generally stated as including situating a plurality of detection apparatuses within the containment and disposed in the fluid, each detection apparatus can be generally stated as including a support, a drogue, and a measurement apparatus, the support can be generally stated as including a body, the body having a channel formed therein, the drogue situated on the support and being disposed within the channel, the measurement apparatus can be generally stated as including a load detection apparatus that is situated between the drogue and the support and that is structured to output a signal that is responsive to a load on the drogue due to the fluid within the channel, receiving, the signal from each of at least some of the plurality of detection apparatuses as a number of inputs to the processor, and determining at least one of a temperature of the fluid and a flow rate of the fluid based at least in part upon the number of inputs.

BRIEF DESCRIPTION OF THE DRAWINGS

A further understanding of the invention can be gained from the following Description when read in conjunction with the accompanying drawings in which.

Similar numerals refer to similar parts throughout the specification.

DESCRIPTION

An improved system 2 in accordance with an aspect of the disclosed and claimed concept is depicted generally in FIG. 1. The system 2 includes a nuclear reactor 4, a detection system 8, and a data processing system 10. As will be set forth in greater detail below, the detection system 8 advantageously is configured to detect temperature and flow conditions of the nuclear reactor 4 through the use of simple physics and calibration data, which greatly simplifies the collection of data and the determination of relevant properties of the nuclear reactor 4.

The nuclear reactor 4 can be said to include a containment 14, a core 16 situated within an interior 20 of the containment 14, an amount of fluid 22 that serves as a coolant that is situated in heat transfer contact with the core 16. The fluid 22 flows through a primary loop that is in heat transfer relation with a secondary loop that is connected with turbines and the like that perform useful work. The fluid 22 flows out of a number of outlets, one of which is depicted at the numeral 26, of the primary loop and into the interior 20 of the containment 14.

As can further be understood from FIG. 1, the data processing system 10 can be said to include a processor apparatus 28 that includes a processor 32 and a storage 34 that are in communication with one another. The storage 34 has a number of routines 38 stored therein which, when executed on the processor 32, cause the processor apparatus 28 and the system 2 to perform certain operations such as are set forth herein. As employed herein, the expression "a number of" and variations thereof shall refer broadly to any non-zero quantity, including, a quantity of one. The data processing system 10 further includes an input apparatus 40 that provides input signals to the processor 32 and an output apparatus 44 that receives output signals from the processor 32.

Figure 2:
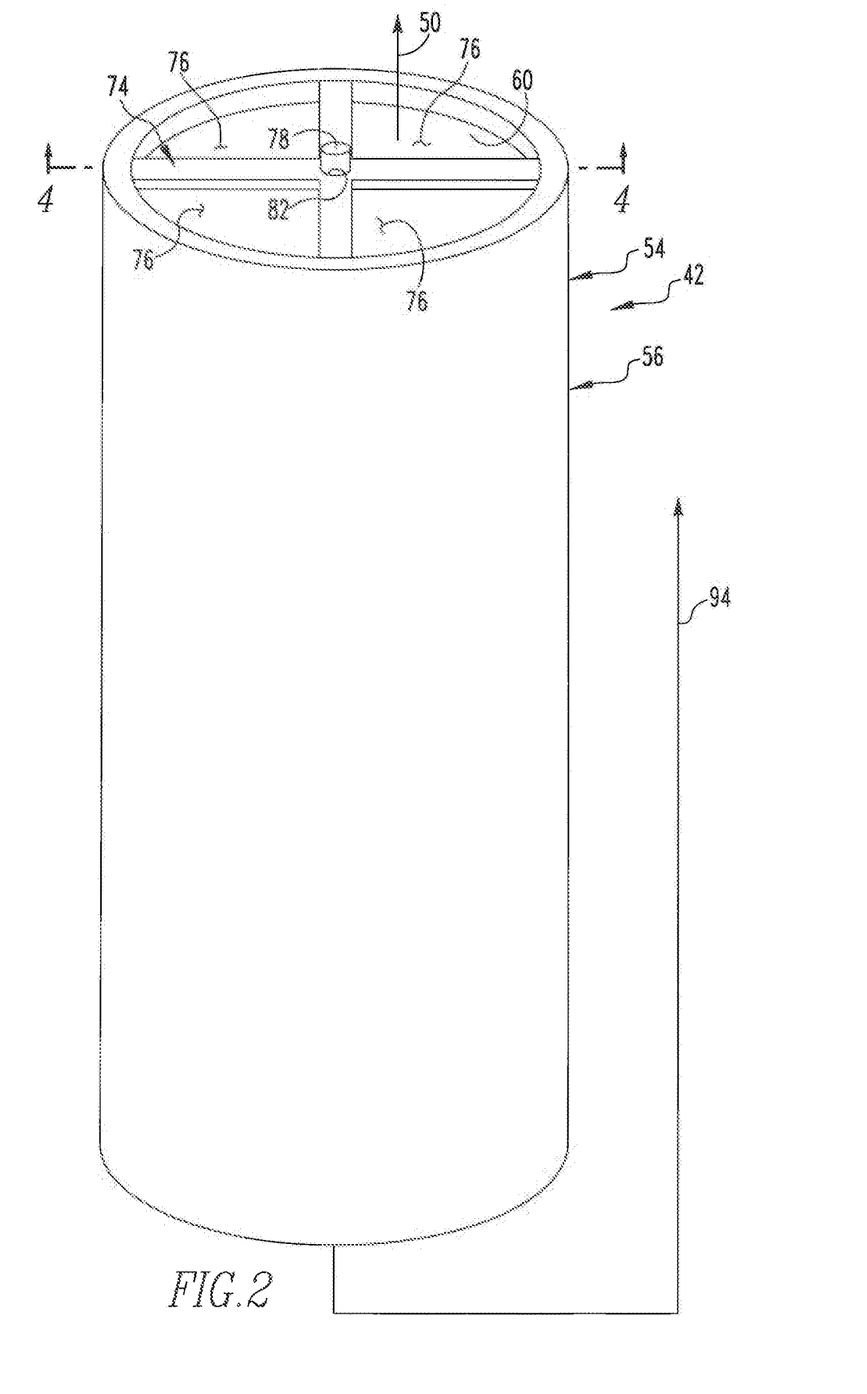
FIG. 2 is a depiction of an improved detection apparatus in accordance with the disclosed and claimed concept.
Figure 3:
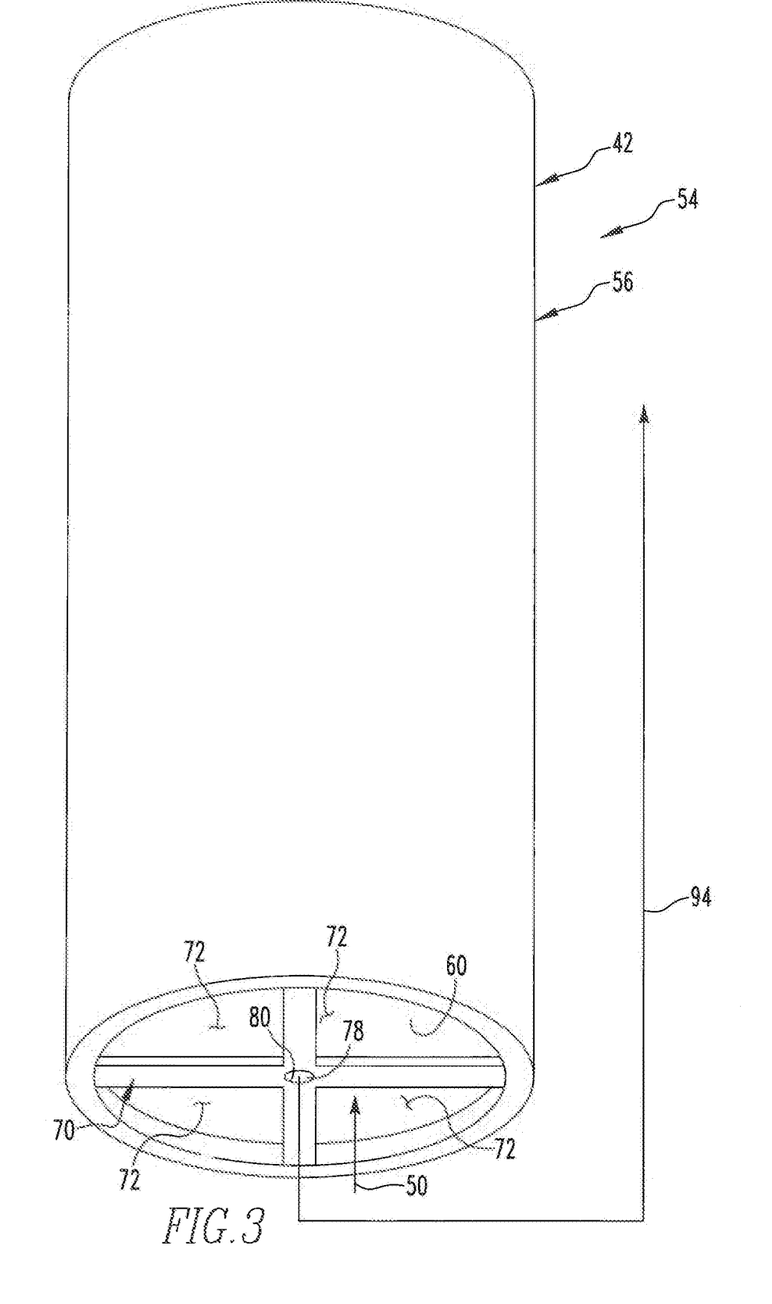
FIG. 3 is another view of the detection apparatus of FIG. 2.
Figure 6:
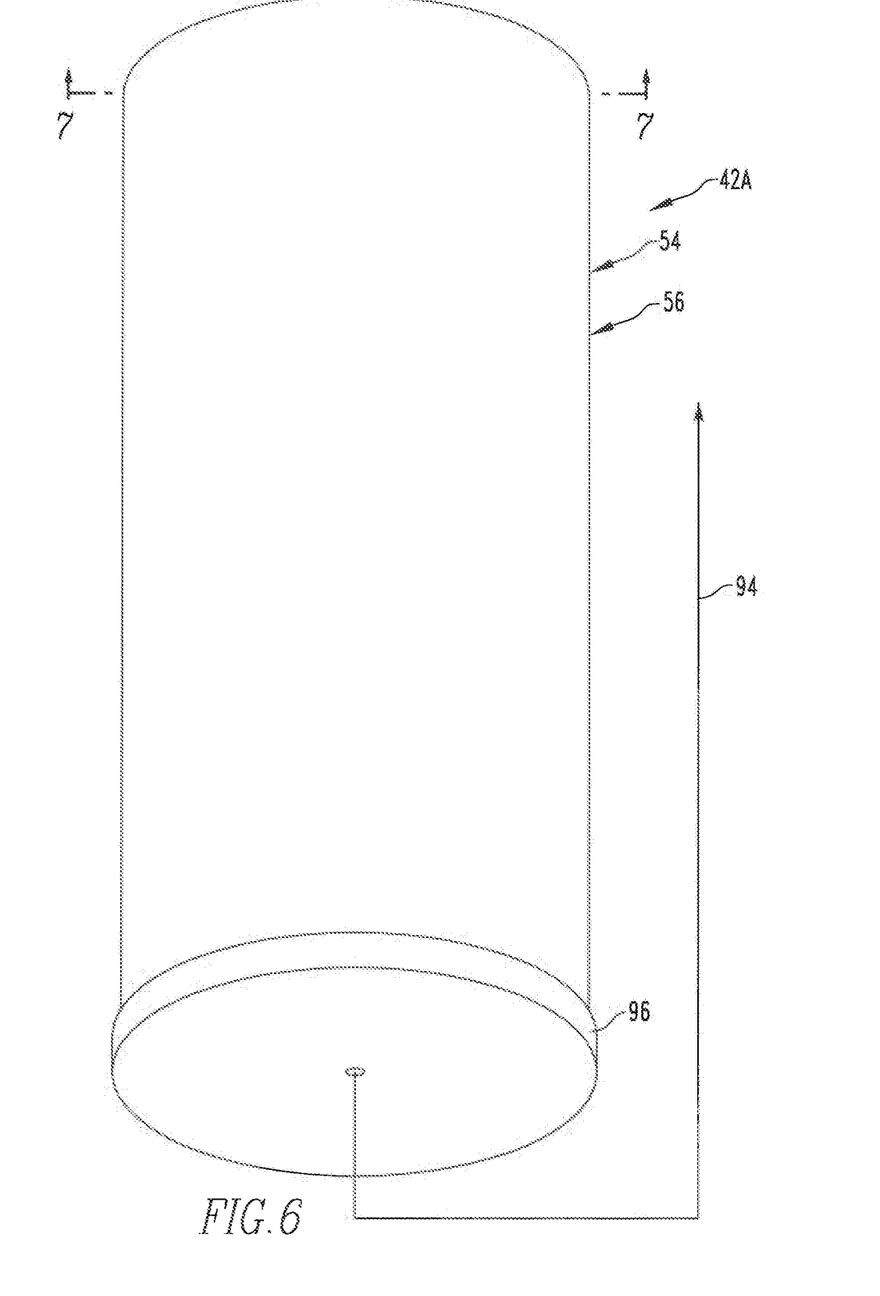
FIG. 6 is a view similar to FIG. 3, except it is a depiction of modified detection apparatus having a blocked inlet.

The detection system 8 that is depicted in FIG. 1 includes a plurality of detection apparatuses that are depicted at the numeral 42 in FIGS. 2 and 3, by way of example, and further includes a number of detection apparatuses that are indicated at the numeral 42A, as in FIG. 6. The detection apparatuses 42A are similar to the detection apparatuses 42, except are slightly modified, as will be set forth in greater detail below. It is understood that the detection apparatuses 42 and the detection apparatuses 42A may be collectively or individually referred to herein with the numeral 42.

Referring again to FIG. 1, the detection system 8 additionally includes a number of grids that are indicated that the numerals 48A, 48B, and 48C, and which may be collectively or individually referred to herein with the numeral 48. The grids 48 support the detection apparatuses 42 and the detection apparatuses 42A at various locations within the interior 20 of the containment 14, with some such locations being proximate to the core 16. More particularly, a number of the grids 48A support a number of the detection apparatuses 42 or a number of the detection apparatuses 42A, or both, at the lower end of the core 16, which is an inlet end of the core 16, as can be understood from an arrow that is depicted in FIG. 1 at the numeral 50 and which is representative of a flow direction of the fluid 22 with respect to the core 16. Likewise, a number of the grids 48B support a number of the detection apparatuses 42 or a number of the detection apparatuses 42A, or both, at an outlet end of the core 16, which is situated vertically above the core 16. Furthermore, a number of the grids 48C support a number of the detection apparatuses 42 or a number of the detection apparatuses 42A, or both, at a location lateral to the core 16, i.e., peripheral to the core 16, and situated generally adjacent the outlets from the primary pump, such as adjacent the outlet 26. It is understood that other positioning of the detection apparatuses 42 is possible without departing from the spirit of the depicted exemplary embodiment.

Figure 4:
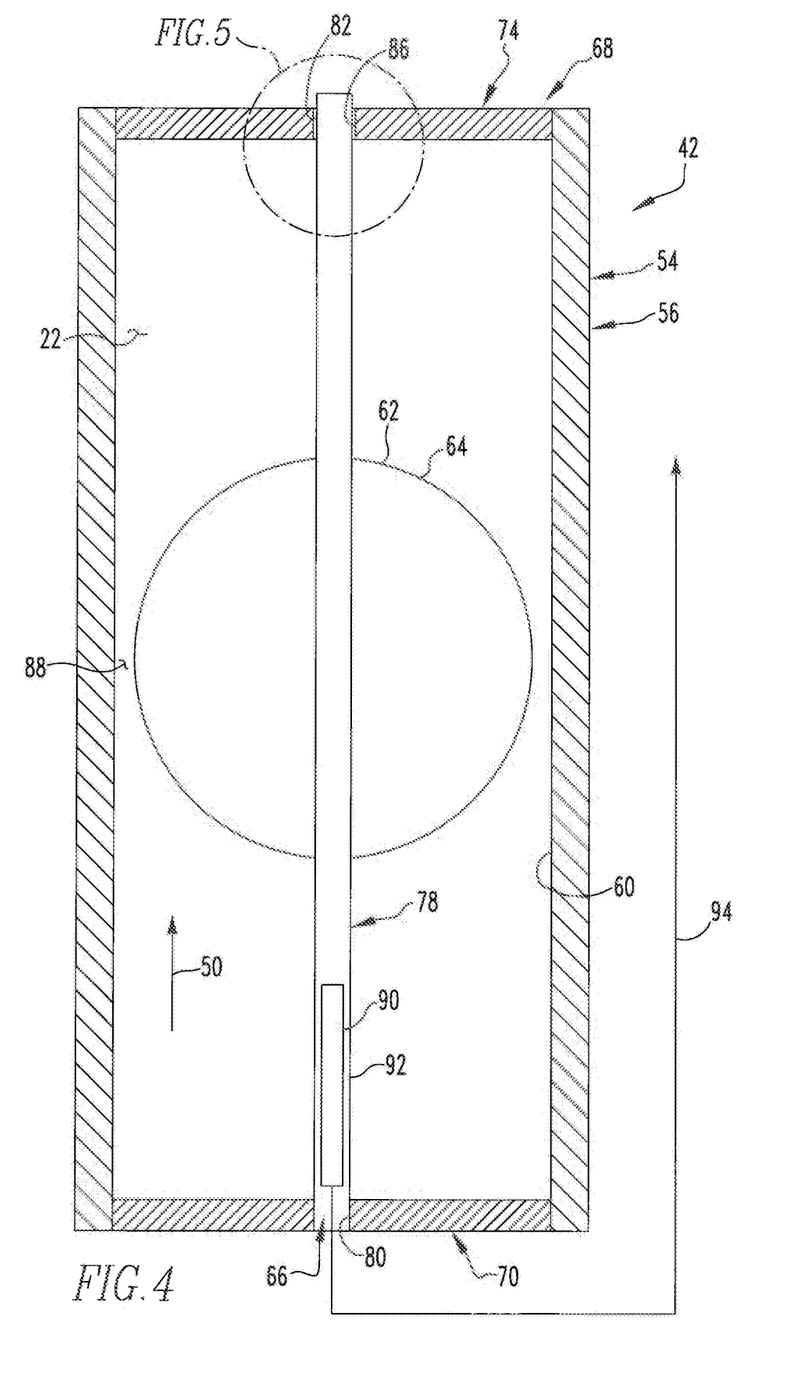
FIG. 4 is a sectional view as taken along line 4-4 of FIG. 2.

As can be understood from FIGS. 2-4, each detection apparatus 42 can be said to include a support 54 having a cylindrical body 56 within which a cylindrical channel 60 is formed, such that the body 56 has the shape of a cylindrical tube. The detection apparatus 42 further includes a drogue 62 situated on the support 54 within the channel 60. In the depicted exemplary embodiment, the drogue 62 is of a generally spherical shape and has a drogue surface 64 external thereto. The detection apparatus 42 further includes a measurement apparatus 66 that is configured to detect forces that are applied to the drogue 62 and to responsively output and communicate to the input apparatus 40 signals that are representative of such loading on the drogue 62 due to the fluid 22 within the channel 60.

As can be understood from FIGS. 2-4, the support 54 further includes a base 68 that includes a first portion 70 (FIG. 3) that affixed to the body 56 at a lower, input end of the channel 60 and further includes a second portion 74 (FIG. 2) that is affixed to the body 56 at an upper, outlet end of the channel 60. As can be seen in FIG. 3, the first portion 70 has a number of first openings 72 formed therein that permit the fluid 22 to flow into the channel 60. As can be seen in FIG. 2, the second portion 74 has a number of second openings 76 formed therein that permit the fluid 22 to flow out of the channel 60 and out of the second openings 76. In this regard, and as can be understood from FIG. 4, the channel 60 is elongated, and the body 56 in the depicted exemplary embodiment is oriented with respect to the flow direction 50 such that the channel 60 is substantially parallel with the flow direction 50. During operation of the system 2, the fluid 22 flows in the flow direction 50 and enters the first openings 72 flows through the channel 60 and past the drogue 62, and continues along the flow direction 50, ultimately flowing out of the second openings 76. The first and second portions 70 and 74 and their first and second openings 72 and 76 are configured to have minimal effect on the flow of the fluid 22 into, through, and out of the channel 60. As will further be set forth in greater detail below, the detection apparatus 42A is a modified version of the detection apparatus 42, and it is noted that in the detection apparatus 42A the fluid 22 is situated in the channel 60 but is stagnant therein and thus does not flow past the drogue 62 and rather is merely in physical contact with the drogue 62 at the drogue surface 64.

Figure 5:
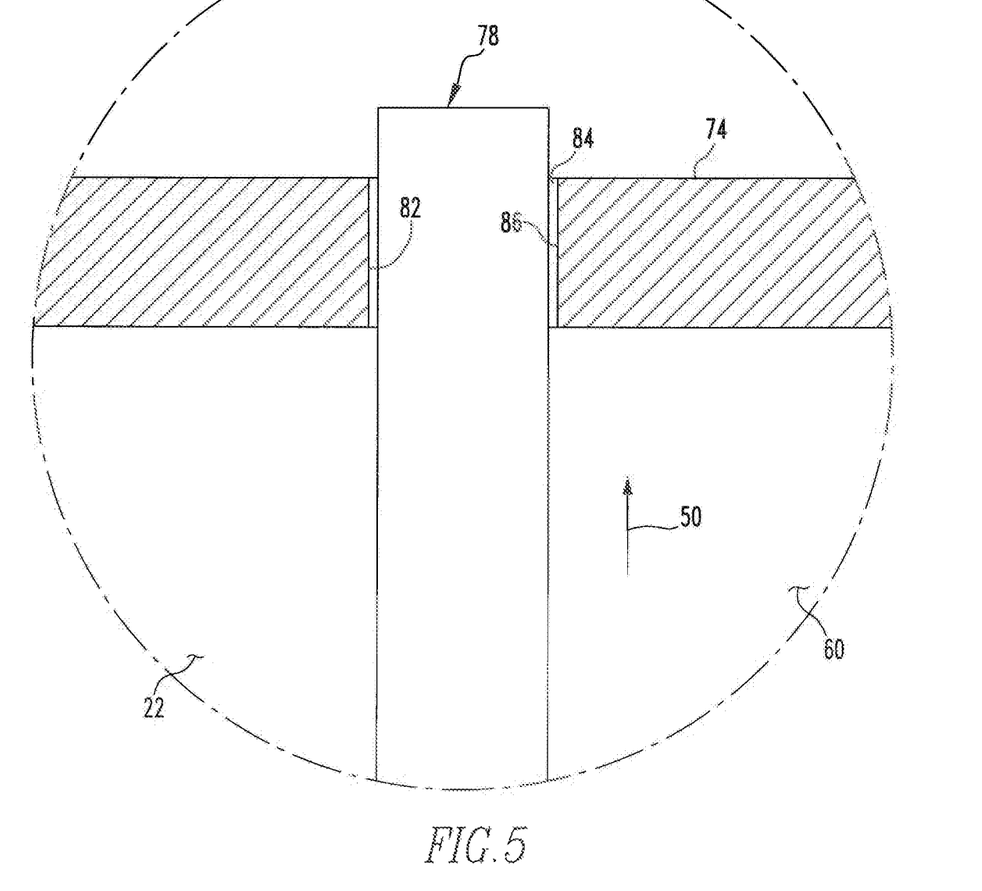
FIG. 5 is an enlargement of an indicated portion of FIG. 4.

As is best shown in FIG. 4, the support 54 further includes a mount 78 that is in the exemplary form of a thin, rigid rod that extends through the channel 62 and is the structure upon which the drogue 62 is affixed. The mount 78 has a fixed connection 80 with the first portion 70 and has a movable connection 82 with the second portion 74. The fixed connection 80 between the mount 78 and the first portion 72 rigidly positions the drogue 62 at the radial center of the channel 60, and the rigid nature of the mount 78 and the rigidity of the fixed connection 80 together rigidly support the drogue 62 within the channel 60. The movable connection 82 between the mount 78 and the second portion 74 is more clearly depicted in FIG. 5 which demonstrates a greatly exaggerated clearance 84 between the mount 78 and a receptacle 86 that is formed in the second portion 74 to enable the mount 78 to be telescopingly received in the receptacle 86. That is, the mount 78 is freely movable within the receptacle 86 in the second portion 74 whereas the mount 78 is affixed to the first portion 70. It is further noted that the first and second portions 70 and 74 would serve to retain the drogue 62 within the channel 60 in the event that the drogue should somehow come loose from the support 54. This advantageously reduces the potential to have a loose part in the nuclear reactor 4. It is noted that other structures may be provided in the channel 60 to further minimizes the potential to have a loose part in the nuclear reactor 4.

As is best shown in FIG. 4, an annular space 88 exists between a surface 89 of the channel 60 and the surface 64 of the drogue 62. When the fluid 22 is flowing through the channel 60 in the flow direction 50, the flow of the fluid 22 interacts with the drogue 62 by applying form drag forces and skin drag forces to the drogue surface 64. The measurement apparatus 66 of the detection apparatus 42 thus is advantageously configured to include a load detection apparatus 90 that is in the exemplary form of a stain gauge that is situated on an upstream part 92 of the mount 78 that is situated upstream of the drogue 62, i.e., between the drogue 62 and the first portion 70. The load detection apparatus 92 detects loading on the drogue 62 and communicates to the input apparatus 40 via a signal cable 94 of the measurement apparatus 66 a signal that is representative of such loading. In the depicted exemplary embodiment, the signal cable 94 is a Mineral Insulated (MI) cable that is routed out of the containment 14 to the data processing system 10, it being noted that the data processing system 10 is situated external to the containment 14.

As noted hereinbefore, the buoyancy of the drogue 62 within the fluid 22 is a function of the temperature of the fluid 22. Such changes in buoyancy of the drogue 62 can result in a change in the signal that is output by the load detection apparatus 90. However, it is noted that the flow of the fluid 22 through the space 88 and past the drogue 62 likewise applies loading to the drogue 62. As a result, the signal that is output by the load detection apparatus 90 of the detection apparatus 42 wherein the fluid 22 is flowing in the flow direction 50 into the first openings 72, through the space 88, and out of the second openings 76 can include a first signal component that is based upon the flowing of the fluid 22 past the drogue 62 and can include a second signal component that is based upon the buoyancy of the drogue 62 in the fluid 22, the second signal component being based upon the temperature of the fluid 22.

Figure 7:
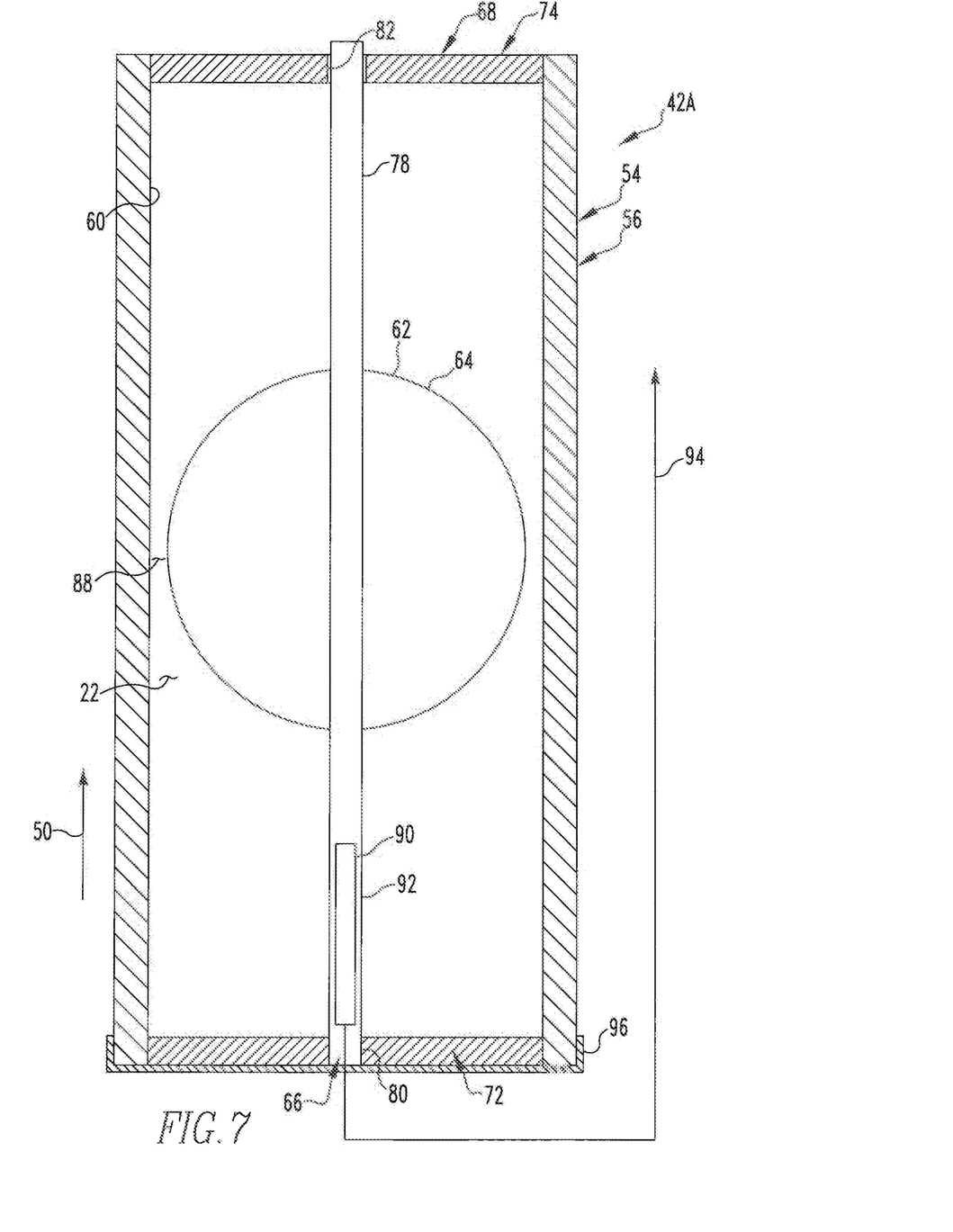
FIG. 7 is a sectional view as taken along line 7-7 of FIG. 6.

Advantageously, therefore, one or more instances of the detection apparatus 42 are modified to include a cap 96 as shown in FIGS. 6 and 7 to result in the modified detection apparatus 42A. The modified detection apparatus 42A is identical in all respects to the detection apparatus 42, except that the detection apparatus 42A has its first openings 72 blocked, such as with the use of the cap 96 or otherwise, to resist the fluid 22 from flowing in the flow direction 50 and past the drogue 62, and rather permits the fluid 22 to enter the channel 60 via the second openings 76, which remain open despite the cap 96 being affixed at the opposite end of the body 56, and to remain static within the channel 60. As such, the cap 96 can be said to resist the fluid 22 from flowing into the first openings 72 and to further resist the fluid 22 from flowing past the drogue 62. Furthermore, it is understood that any of a variety of devices and structures can be employed that close or otherwise block the first openings 62 so long as such structures that perform the blocking do not affect the way in which loading on the drogue 62 is detected by the load detection apparatus 90 and is communicated via the signal cable 94.

It is understood that FIG. 1 depicts only a small representative number of the detection apparatuses 42 and, does not expressly distinguish between the detection apparatuses 42 and the detection apparatuses 42A. It is understood that any of a variety of strategies may be employed with regard to the positioning and deployment of the detection apparatuses 42 and the detection apparatuses 42A with respect to the core 16.

During operation of the system 2, the detection apparatuses 42A are situated such that the fluid 22 is stagnant within the channel 60 and is in contact with the drogue 62. If the signal from the load detection apparatus 90 of the detection apparatus 42A is, unvarying, this indicates that the buoyancy of the drogue 62 within the fluid 22 is likewise unvarying, which means that the temperature of the fluid 22 is similarly unvarying. As a result, this indicates that any change in loading of the drogue 62, as detected by the load detection apparatus 90 of the detection apparatus 42 through which the fluid 22 is flowing through the channel 60 and past the drogue 62, is a result of the flowing of the fluid 22 past the drogue 62.

For instance, if it is determined that the temperature of the fluid 22 is unvarying, such as due to the aforementioned determination that the output signal from the load detection apparatus 90 of the detection apparatus 42A is unvarying, and if the signal from the load detection apparatus 90 of the detection apparatus 42 is likewise unvarying in the presence of the fluid 22 flowing through the space 88, this would indicate that the mass flow rate of the fluid 22, i.e., the flow rate of the fluid 22, is likewise unvarying. On the other hand, if the temperature is determined to be unvarying, but that the signal from the load detection apparatus 90 on the detection apparatus 42 is varying when the fluid 22 is flowing through space 88, this would indicate that the mass flow rate, i.e., the flow rate of the fluid 22, is varying. Still further, if it is determined that the signal from the load detection apparatus 90 of the detection apparatus 42A is varying, meaning that the temperature of the fluid 22 is varying, this means that the signal that is output by the load detection apparatus 90 of the detection apparatus 42 wherein the fluid 22 is flowing through the space 88 includes a component that is based upon a varying temperature. As such, the signal from the detection apparatus 42A potentially can be subtracted from the signal that is output by the detection apparatus 42 to result in a net signal that is representative solely of flow-related forces applied to the drogue 62. If the signal from the detection apparatus 42 and that of the detection apparatus 42A are equal in such a situation, this would indicate that temperature is varying while flow rate remains unvarying.

In order to determine actual temperatures and flow rates, a temperature calibration data set 98A and a flow rate calibration data set 98B are established for the detection apparatus 42 and stored in the storage 34, it being noted that the temperature and flow rate calibration sets 98A and 98B may be collectively or individually referred to herein with the numeral 98. The calibration data sets can be established for the detection apparatuses 42 experimentally or empirically, or they could result from a combination of both approaches. The routines 38 employ the logic set forth hereinbefore with regard to the signals from the detection apparatuses 42 and the detection apparatuses 42A, along with whether such signals are varying or non-varying, in order to determine whether temperature, flow rate, or both are varying or are unvarying. Furthermore, the routines employ the calibration data sets 98 to determine actual temperatures and flow rates based upon the signals that are output by the load detection apparatuses 90. In this regard, signals from detection apparatuses 42 that are situated upstream of the core 16 and signals from other detection apparatuses 42 that are situated downstream of the core 16 are employed in order to determine various parameters of the nuclear reactor, such as are set forth hereinbefore. The various parameters and other data can be output via the output apparatus 44, by way of example.

The detection apparatuses 42 can be distributed in a predetermined fashion across the upstream end and the downstream end of the core 16 as needed. Furthermore, the detection apparatuses that are situated on the grid 48C in proximity to the outlet 26 of the primary loop can further be employed to determine temperature and flow rate of the fluid existing the outlet 26. Such data can likewise be employed in performing the analysis mentioned hereinbefore to obtain the various operational parameters of the nuclear reactor 4.

Figure 8:
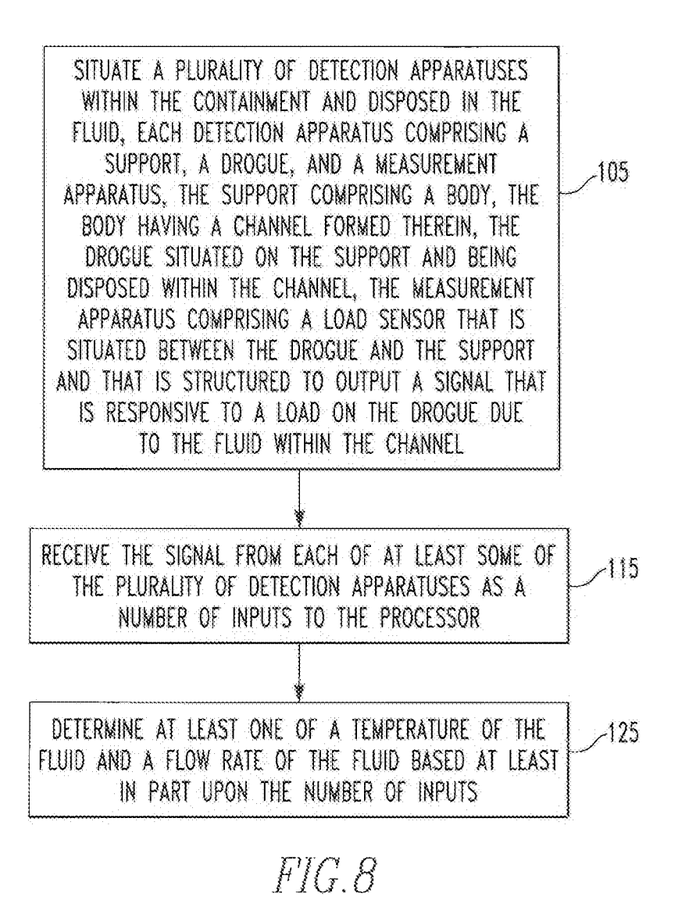
FIG. 8 is a flowchart depicting certain aspects of an improved method in accordance with the disclosed and claimed concept.

FIG. 8 depicts certain aspects of an improved method in accordance with the disclosed and claimed concept as shown in a flowchart. Processing can begin, as at 105, where a plurality of detection apparatuses 42 are situated within a containment 14. Some of the detection apparatuses 42 are those depicted in FIGS. 2-5, and one or more other of the detection apparatuses 42 are of the modified type indicated at the numeral 42A and depicted in FIGS. 6 and 7. The detection apparatuses 42 each include the drogue 62 and output from the load detection apparatus 90 a signal that is responsive to loading on the drogue 62 due to the fluid 22 within the channel 60. In some circumstances, the loading on the drogue 62 may be due solely to buoyancy of the drogue 62 in the fluid 22, such as in the case of the detection apparatus 42A. In other circumstances, the loading on the drogue 62 may be due at least in part to the effect of the flowing of the fluid 22 through the channel 60 and past the drogue 62.

Processing continues, as at 152, where the signal from at least some of the plurality of detection apparatuses 42 is received as a number of inputs to the processor 32. Such signals are received from the signal cables 94 into the input apparatus 40 and are communicated to the processor 32 for use by the routines 38. Processing then continues, as at 125, where at least one of a temperature of the fluid 22 and a flow rate of the fluid 22 are determined, based at least in part upon the number of inputs that were received at 115. In so doing, it may be desirable to employ the temperature calibration data set 98A or the flow rate calibration rate data set 98B or both in making such a determination.

It thus can be seen that the improved system, method, and detection apparatus 42 advantageously enable a determination of temperatures and flow rate values within the containment 14, and such values can be employed to determine values such as reactor power distribution, margin to operating limits, and other values that are of relevance to the operation of the nuclear reactor 4. Other variations will be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A detection apparatus structured to be situated within a flow of a fluid in a nuclear containment, the detection apparatus comprising:
   a support comprising a body, the body having a channel formed therein;
   a drogue situated in the support and being disposed within the channel; and
   a measurement apparatus comprising a load detection apparatus that is situated between the drogue and the support and that is structured to output a signal that is responsive to a load on the drogue due to the fluid within the channel,
   wherein the support further comprises a mount disposed within the channel, wherein the mount supports the drogue within the channel and the drogue is situated on the mount,
   wherein the support further includes a base that includes a first portion affixed to the body at a lower input end of the channel and a second portion affixed to the body at an upper outlet end of the channel, and wherein the mount is fixedly connected with the first portion and moveably connected with the second portion.

2. The detection apparatus of claim 1 wherein the second portion has a receptacle formed therein, the mount being telescopingly received in the receptacle.

3. The detection apparatus of claim 2 wherein a part of the mount extends between the first portion and the drogue, the load detection apparatus being situated on the part of the mount.

4. The detection apparatus of claim 1 wherein the drogue disposed within the channel is spaced from the body.

5. The detection apparatus of claim 4 wherein the support has a number of openings formed therein that are in flow communication with the channel and that are structured to permit the fluid to flow through the channel and past the drogue.

6. The detection apparatus of claim 4 wherein the support has a number of openings formed therein that are in flow communication with the channel and that are structured to permit the fluid to be stagnant in the channel while resisting the fluid from flowing through the channel and past the drogue.

7. A nuclear power system comprising:
a nuclear reactor comprising a containment, a core situated within the containment, and a fluid situated within the containment and in communication with the core;
a plurality of detection apparatuses situated within the containment and disposed in the fluid, each detection apparatus comprising a support, a drogue, and a measurement apparatus;
the support comprising a body, the body having a channel formed therein;
the drogue situated in the support and being disposed within the channel;
wherein the support further comprises a mount disposed within the channel, wherein the mount supports the drogue within the channel and the drogue is situated on the mount,
wherein the support further includes a base that includes a first portion affixed to the body at a lower input end of the channel and a second portion affixed to the body at an upper outlet end of the channel, and wherein the mount is fixedly connected with the first portion and moveably connected with the second portion;
the measurement apparatus comprising a load detection apparatus that is situated between the drogue and the support and that is structured to output a signal that is responsive to a load on the drogue due to the fluid within the channel; and
a processor apparatus comprising a processor and a storage, the load detection apparatus being in communication with the processor;
the storage having stored therein a number of instructions which, when executed on the processor, cause the processor to perform operations comprising:
receiving the signal from each of at least some of the plurality of detection apparatuses as a number of inputs to the processor; and
determining at least one of a temperature of the fluid and a flow rate of the fluid based at least in part upon the number of inputs.

8. The nuclear power system of claim 7 wherein at least a subset of the plurality of detection apparatuses are oriented within the containment such that the channel is parallel with a flow direction of the fluid.

9. The nuclear power system of claim 7 wherein:
a detection apparatus of the plurality of detection apparatuses has as its support a support which has a number of openings formed therein that are in flow communication with its channel and that are structured to permit the fluid to flow through its channel and past its drogue; and
another detection apparatus of the plurality of detection apparatuses has as its support another support which has another number of openings formed therein that are in flow communication with its channel and that are structured to permit the fluid to be stagnant in its channel while resisting the fluid from flowing through its channel and past its drogue.

10. The nuclear power system of claim 9 wherein the operations further comprise:
determining that the signal from the another detection apparatus is unvarying; and
concluding, based at least in part upon the determining, that the fluid has a temperature that is unvarying.

11. The nuclear power system of claim 9 wherein the operations further comprise:
receiving as the signal from the another detection apparatus a signal that is based at least in part upon a buoyancy of the drogue of the another detection apparatus in the fluid; and
employing a temperature calibration data set that is that is based at least in part upon buoyancy to determine the temperature.

12. The nuclear power system of claim 10 wherein the operations further comprise:
making a determination that the signal from the detection apparatus is varying; and
further concluding, based at least in part upon the determination, that the fluid has a flow rate that is varying.

13. The nuclear power system of claim 9 wherein the operations further comprise:
receiving as the signal from the detection apparatus a signal that is based at least in part upon a fluid drag between the drogue of the detection apparatus and the flowing of fluid through the channel and past the drogue of the detection apparatus; and
employing a flow rate calibration data set that is that is based at least in part upon fluid drag to determine a flow rate of the fluid.

14. The nuclear power system of claim 9 wherein the operations further comprise:
determining that the signal from the another detection apparatus is varying; and
concluding, based at least in part upon the determining, that the fluid has a temperature that is varying.

15. The nuclear power system of claim 14 wherein the operations further comprise receiving as the signal from the detection apparatus a signal that is based at least in part upon:
a fluid drag between the drogue of the detection apparatus and the flowing of fluid through the channel and past the drogue of the detection apparatus; and
a buoyancy of the drogue of the detection apparatus in the fluid.

16. The nuclear power system of claim 7 wherein:
a first subset of the plurality of detection apparatuses are positioned within the fluid upstream of the core; and
a second subset of the plurality of detection apparatuses are positioned within the fluid downstream of the core.

17. The nuclear power system of claim 16 wherein:
the nuclear reactor further comprises an outlet through which the fluid flows; and
a third subset of the plurality of detection apparatuses are positioned within the fluid between the outlet and the first subset.

* * * * *